United States Patent [19]

Gagas

[11] 4,440,407
[45] Apr. 3, 1984

[54] MANHOLE COVER GASKET SEAL

[76] Inventor: Michael Gagas, 5558 N. Shoreland Ave., Milwaukee, Wis. 53217

[21] Appl. No.: 444,504

[22] Filed: Nov. 24, 1982

[51] Int. Cl.³ ............................................... F16J 15/10
[52] U.S. Cl. ............................ 277/212 F; 277/DIG. 2
[58] Field of Search ........... 277/207 R, 207 D, 212 F, 277/212, DIG. 2

[56] References Cited

U.S. PATENT DOCUMENTS

| 696,183 | 3/1902 | McAuliffe | 277/212 |
| 3,147,014 | 9/1964 | Ohnstad | 277/207 A |
| 3,199,879 | 8/1965 | Fleming | 277/212 F |
| 3,355,057 | 11/1967 | MacKenzie et al. | 277/207 R |
| 3,406,409 | 10/1968 | Burns | 277/207 R |
| 3,979,130 | 9/1976 | Cowie | 277/212 F |

Primary Examiner—Robert I. Smith
Attorney, Agent, or Firm—Ronald E. Barry

[57] ABSTRACT

A manhole cover gasket seal to seal a manhole cover in the opening of a manhole frame, the seal including a flat circular ring, an annular flange secured to the inner diameter of the ring and having a diameter substantially equal to the diameter in the opening of the manhole frame and a bead formed around the top of the ring and projecting slightly above the ring, the ring, flange and bead being formed as an integral unit of a resilient elastomeric material.

9 Claims, 5 Drawing Figures

U.S. Patent   Apr. 3, 1984   4,440,407
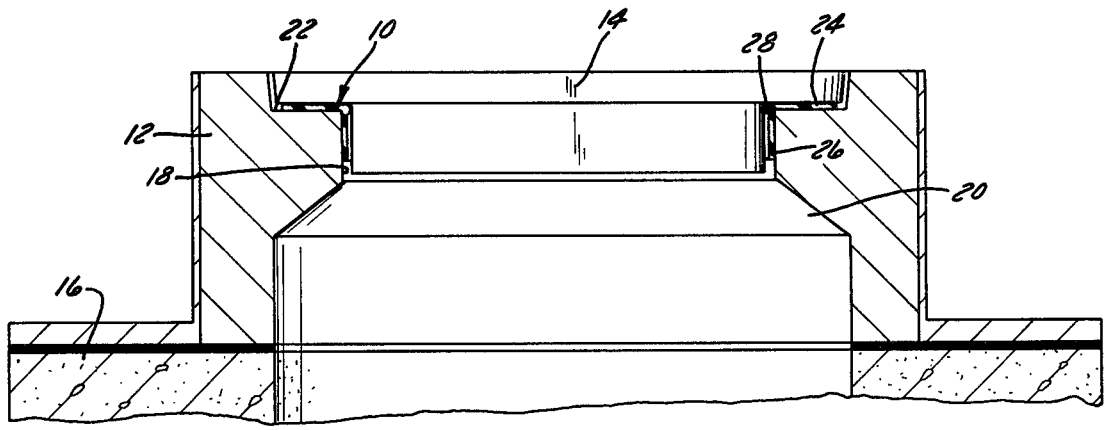
FIG. 1
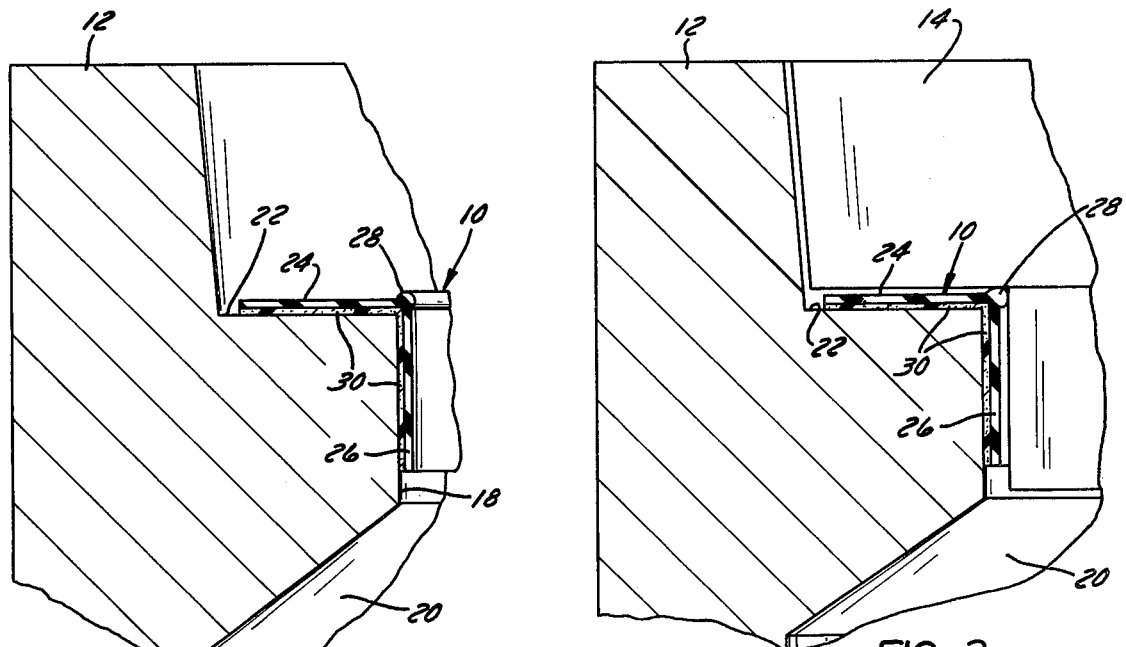
FIG. 2
FIG. 3
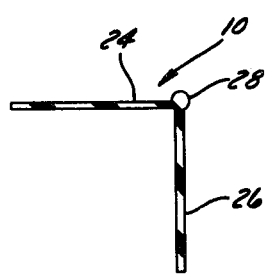
FIG. 4
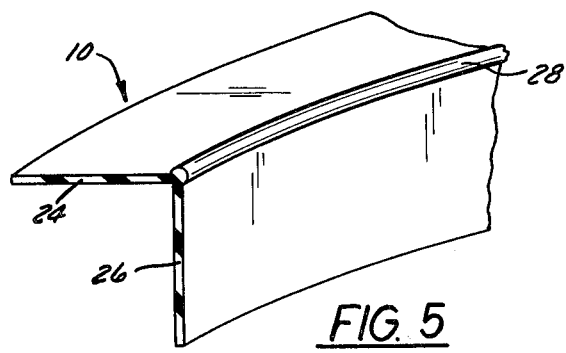
FIG. 5

MANHOLE COVER GASKET SEAL

BACKGROUND OF THE INVENTION

Surface water inflow into the sanitary sewer system through manholes has been recognized as a major problem because of the increased flow of fluid to processed by the sanitary system. Numerous types of seals have been devised for sealing the manhole frame to the manhole casement. However there has been little or no effort to seal the manhole cover in the opening in the manhole frame.

SUMMARY OF THE INVENTION

The manhole cover gasket seal according to the present invention provides a positive seal between the cover and manhole frame whenever the cover is placed in the opening in the frame. The seal is provided with a flat circular ring and an annular depending flange to positively locate the seal in the opening of the manhole frame. The seal can be permanently secured to the opening in the manhole frame by cementing the seal to the frame. An annular bead may be provided on the surface of the ring to positively engage the undersurface of the cover to provide a positive seal. The seal can be made of a resilient material such as neoprene and can be formed as an integral unit.

IN THE DRAWINGS

FIG. 1 is a cross sectional view in elevation showing a manhole frame positioned on a manhole casement with the manhole cover gasket seal shown positioned between the cover and the frame.

FIG. 2 is an enlarged view of a portion of the manhole frame showing the location of the seal on the frame.

FIG. 3 is an enlarged view of a section of the frame showing the manhole cover seated on the gasket seal.

FIG. 4 is a cross sectional view of the seal.

FIG. 5 is a perspective view of portion of the gasket seal.

DESCRIPTION OF THE INVENTION

The gasket seal 10 according to the present invention as seen in FIG. 1 is used to provide a seal between a manhole frame 12 and a manhole cover 14. As is generally understood, the manhole frame 12 is generally seated on a concrete or masonry casement 16 to provide an opening into the sewer system. The manhole frame is then imbeded in the asphalt or cement material that forms the street surface. The manhole frame 12 is provided with an internal flange 18 that forms an opening 20 to the sewer system and a seat 22 for the manhole cover 14.

The gasket seal 10 according to the present invention includes a first circular section or ring 24 and a second annular depending section or flange 26. The first section or ring 24 overlies the manhole frame seat 22 to provide the means for sealing the cover 14 to the frame. The second section or flange 26 depends from the first section 24 and provides the means for locating the seal in the opening 20 in the manhole frame. The flange 26 is secured to the inner diameter of the annular ring 24 and has an outer diameter substantially equal to the inner diameter of the opening 20 in the frame.

Means can be provided on the surface of ring 24 to produce a positive seal whenever the manhole cover 14 is placed on the seat 22 in the manhole frame 16. Such means is in the form of a resilient head 28 shown located at the top of the flange 26 around the inner edge of the ring 24. The bead 28 will then project slightly above the surface of the ring 24. The bead 28 can be formed as an integral part of the gasket seal and although shown on the inner edge of the gasket can be located on the surface of the ring 24 spaced inwardly from the inner edge of the ring 14. As seen in FIG. 3, the seal 28 will be squeezed by the weight of the cover to provide a seal.

The gasket seal 10 is normally placed in the manhole frame with the ring 24 lying on the seat 22 with the flange 26 aligned in the opening 20. Means can be provided for securing the gasket seal 10 to the manhole frame. Such means is in the form of a rubber cement 30 provided on the surface of the seat 22 and the inner surface of the opening 18. The seat 22 should be burnished prior to the application of the cement to the surface of the seat 22.

The ring 24 provides the seal between the cover and the manhole frame. However, as indicated above, the bead 28 can be provided on the surface of the ring 24 to provide a seal whenever the cover is placed in the manhole frame.

The embodiments of the invention in which an exclusive property or privilege is claimed, are defined as follows:

1. The combination of a manhole frame having a circular opening and a recess around the opening forming a manhole cover seat, and
    a manhole cover positioned on said seat, the improvement comprising
    a manhole cover gasket seal for sealing the manhole cover in the recess of the manhole frame, said seal comprising
    a first annular section having an inner diameter substantially equal to the diameter of the opening in the manhole frame and
    a second annular section having an outer diameter substantially equal to the diameter of the opening in the manhole frame, said second section being secured to said first section, whereby said first section forms a seal between the manhole cover and the seat around the opening in the frame and said second section holds the first section in position around the opening in the manhole frame.

2. The combination according to claim 1 wherein said first and second sections are formed as an integral unit.

3. The combination according to claim 1 or 2 including a resilient bead formed around the upper surface of said first section.

4. The combination according to claim 1 including means for securing the first and second sections to the manhole frame.

5. The combination of a manhole frame having a circular frame and a recess in the frame around the opening to form a cover seat, and
    a manhole cover adapted to be placed in said recess on said seat, the improvement comprising
    a manhole cover gasket seal for sealing a manhole cover in the opening in a manhole frame to prevent the flow of water into the manhole, said seal comprising
    a flat resilient ring having an inner diameter substantially equal to the inner diameter of the opening in the manhole frame and
    a resilient annular flange having an outer diameter substantially equal to the diameter of the opening in said manhole frame, said flange being secured to the inner diameter of said ring and depending therefrom into the opening in said manhole frame when the gasket seal is placed on the cover seat around the opening in the manhole frame whereby the weight of the manhole cover on the ring will form a seal around the opening in the manhole frame.

6. The combination according to claim 5 wherein said ring and flange are formed as an integral unit.

7. The combination according to claim 5 or 6 including a resilient bead formed around the top of said ring and projecting slightly above the surface of said ring to engage the under surface of the manhole cover.

8. The combination according to claim 7, wherein said bead is formed as an integral part of said ring.

9. The combination according to claim 8 wherein said ring, flange and bead are formed from an elastomeric material.

* * * * *